United States Patent [19]
Seko

[11] 3,910,597
[45] Oct. 7, 1975

[54] VEHICLE STEERING COLUMN-STEERING WHEEL ASSEMBLY

[75] Inventor: Akira Seko, Yokohama, Japan

[73] Assignee: Nissan Motor Company, Limited, Japan

[22] Filed: Dec. 3, 1973

[21] Appl. No.: 421,108

[30] Foreign Application Priority Data
Dec. 5, 1972 Japan.............................. 47-121173

[52] U.S. Cl............... 280/150 AB; 74/423; 74/498; 74/552; 224/29 E; 280/87 R
[51] Int. Cl.²........................................ B60R 21/08
[58] Field of Search........ 280/150 AB, 87 R, 150 B; 74/552, 485, 492, 494, 423, 498; 224/29 E

[56] References Cited
UNITED STATES PATENTS

| | | |
|---|---|---|
| 1,130,263 | 3/1915 | Duryea .............................. 74/485 |
| 1,370,900 | 3/1921 | Molesworth .......................... 74/494 |
| 2,206,512 | 7/1940 | Reinholz et al.................... 74/485 X |
| 2,699,034 | 1/1955 | Maire................................ 74/552 X |
| 2,842,372 | 7/1958 | D'Antini....................... 280/150 AB |
| 3,744,817 | 7/1973 | Ousset................................ 280/87 R |
| 3,801,123 | 4/1974 | Jira............................. 280/150 AB |

Primary Examiner—David Schonberg
Assistant Examiner—John P. Silverstrim
Attorney, Agent, or Firm—Robert E. Burns; Emmanuel J. Lobato; Bruce L. Adams

[57] ABSTRACT

A device attached to a steering wheel-steering column assembly for stationarily supporting an air bag to protect the driver in case of collision.

3 Claims, 4 Drawing Figures

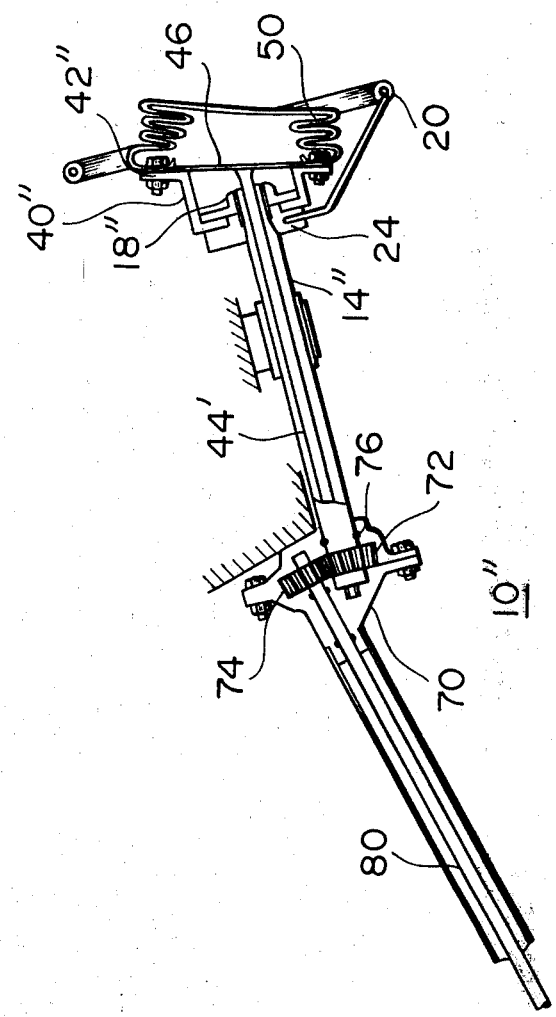

VEHICLE STEERING COLUMN-STEERING WHEEL ASSEMBLY

The present invention relates to a device mounted on a vehicle steering wheel-steering column assembly to stationarily support a safety bag or confinement for driver protection in a collision.

In known arrangements of an inflatable safety bag intended to protect the vehicle driver and fastened to the hub of a steering wheel or the steering wheel itself the bag rotates with the angular movement of the steering wheel when the driver wishes to make a turn. In order to keep the position of the bag in the same relationship with the operator regardless of the position to which the steering wheel is rotated, the central axis of the bag has to align with the axis of rotation of the steering wheel when the baf is in its inflated condition. Also, the inflated bag has to be of a symmetrical configuration with respect to the axis of rotation of the steering wheel. Accordingly, in the known arrangements described, it is impossible to freely choose an optimum positional relationship between the inflated bag and the driver as well as its configuration in the inflated condition.

It is therefore an object of the invention to provide an improved steering wheel-steering column assembly to support an inflatable safety bag or confinement, which obviates the aforementioned difficulties.

Another object of the invention is to provide an improved steering wheel-steering column assembly on which an inflatable bag or confinement is mounted stationarily relative to the rotation of the steering wheel whereby a constant positional relationship between the bag and the operator is kept non-aligned regarding the axis of the inflated bag vs. the axis of rotation of the steering wheel.

These and other objects and features of the invention will become more apparent upon consideration of the following description taken in connection with the accompanying drawings wherein:

FIGS. 2, 3 and 4 are longitudinal section views showing three different preferred embodiments of a steering wheel-steering column assembly provided with an inflatable bag or confinement according to the invention.

Figure 1:
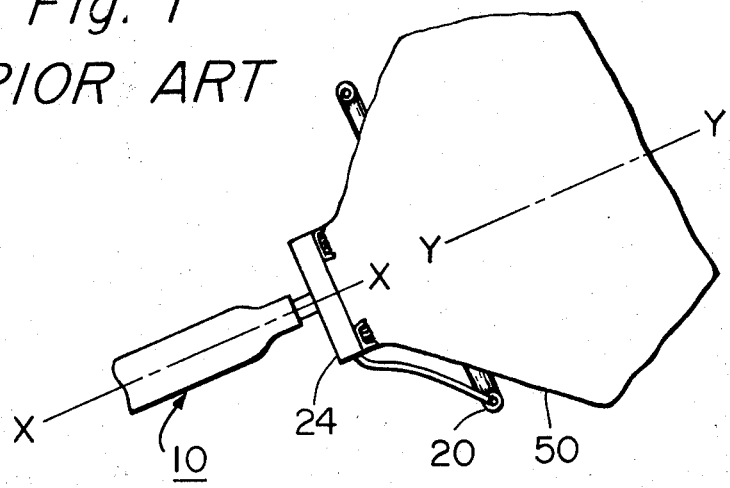
FIG. 1 is a longitudinal section view of a conventional steering wheel-steering column assembly with an inflated bag or confinement attached thereto.

In a conventional arrangement shown in FIG. 1, a bag or confinement 50 is secured to a hub 24 of a steering wheel 20 as already described, and upon inflation extends beyond the steering wheel 20, substantially symmetrically about the central axis Y — Y of the bag. The axis Y — Y is coincident with the axis X — X of rotation of the hub 24 and the steering column 10. The shortcomings involved in this arrangement are already apparent from the foregoing paragraphs.

Figure 2:
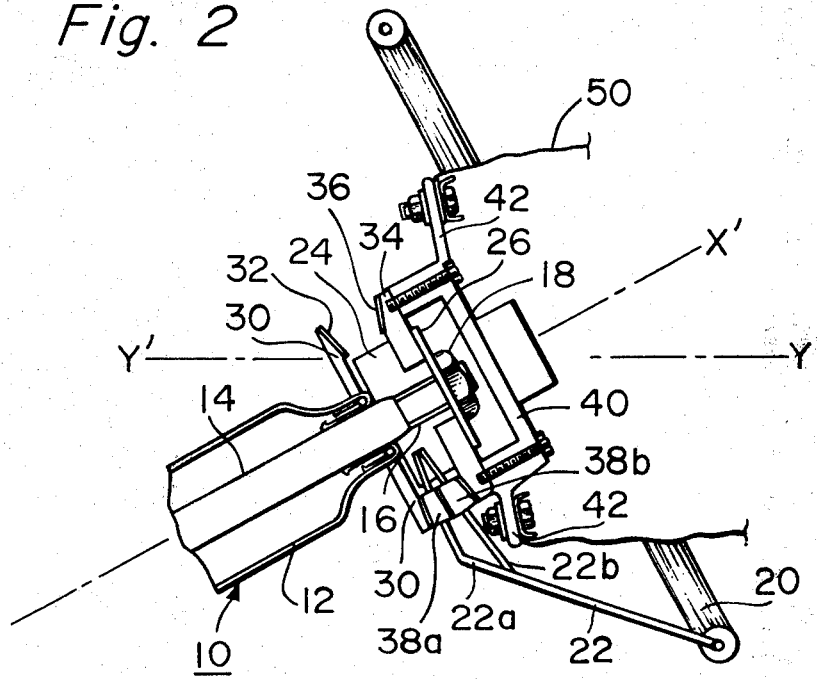

Referring now to a preferred embodiment according to the invention shown in FIG. 2, a conventional steering column 10 includes an envelope 12 concentrically enclosing a steering shaft 14, the envelope being secured to a stationary portion of the vehicle body (not shown). To the uppermost end of the envelope 12 is secured a flange 30 which forms a bevel gear with a plurality of gear teeth 32 on its upper circumference, for the purpose that will be later described. The hub 24 of the steering wheel 20 is in spline connection with a splined section 16 of the steering shaft 14 and is tightly fastened to the shaft 14 by a nut 18. An annular support member 34 surrounds an axial protrusion (no numeral) of the hub 24 and engages the hub surface to allow rotation relative to each other. The support member 34 is retained in position by means of a plate 26. The lower circumference of the support member 34 is also formed with a plurality of gear teeth 36 opposite to the teeth 32 of the flange 30, forming another bevel gear. To the support member 34 bolted is a mounting bracket 40 formed with a flange 42 to which the inflatable bag or confinement 50 of any conventional type is fastened. Of course, appropriate inflating means are installed in or adjacent the bag to inflate the same into the protective condition during a collision, though not shown. It may be noted that the flange 42 is set radially at a certain angle with respect to the plane containing the end face of the mounting bracket 40, which is parallel to the planes containing respectively the end faces of the support member 34 and the hub 24. As a result, the axis Y' — Y' of the bag in the inflated condition is inclined with respect to the axis X' — X' of rotation of the hub 24 and the steering shaft 14. The flange 42 is attached to the mounting bracket 40 preferably in a manner permitting the adjustment of the aforementioned certain angle, such that the angle between the axis Y' — Y' and the axis X' — X' is adjustable without replacement of any part of the steering system, though not illustrated. In case where the flange 42 is integral with the bracket 40, the inclination angle of the bag with the axis X' — X' is varied to a desired value by replacement of the entire bracket with a new one the flange 42 having a different offset angle. From the rim of the steering wheel 20 extend forward a plurality of spokes 22, each of which is branched into a pair of arms 22a and 22b extending and secured to the hub 24. Two meshing pinions 38a and 38b are rotatably mounted respectively on the arms 22a and 22b serving as pinion shafts. The pinions mesh also with the adjacent bevel gears 32 and 34.

When the operator turns the steering wheel 20 to turn the front wheels, the pinions 38a and 38b and the hub 24 rotate together turning the steering shaft 14 too. Whilst one pinion 38a travels on the fixed bevel gear 32, the other pinion 38b, rotating in the direction opposite to that of the pinion 38a, turns the bevel gear 36 of the support member 34 in the direction opposite to the direction in which the hub 24 is rotated and through the same angle at which the hub is rotated. It will be therefore understood that the support member 34 maintains a constantly stationary position regardless of the rotation of the hub 24. Thus, the bag 50 fastened to the flange 42 faces always the same direction when it is inflated, regardless of the angular position of the steering wheel.

Figure 3:
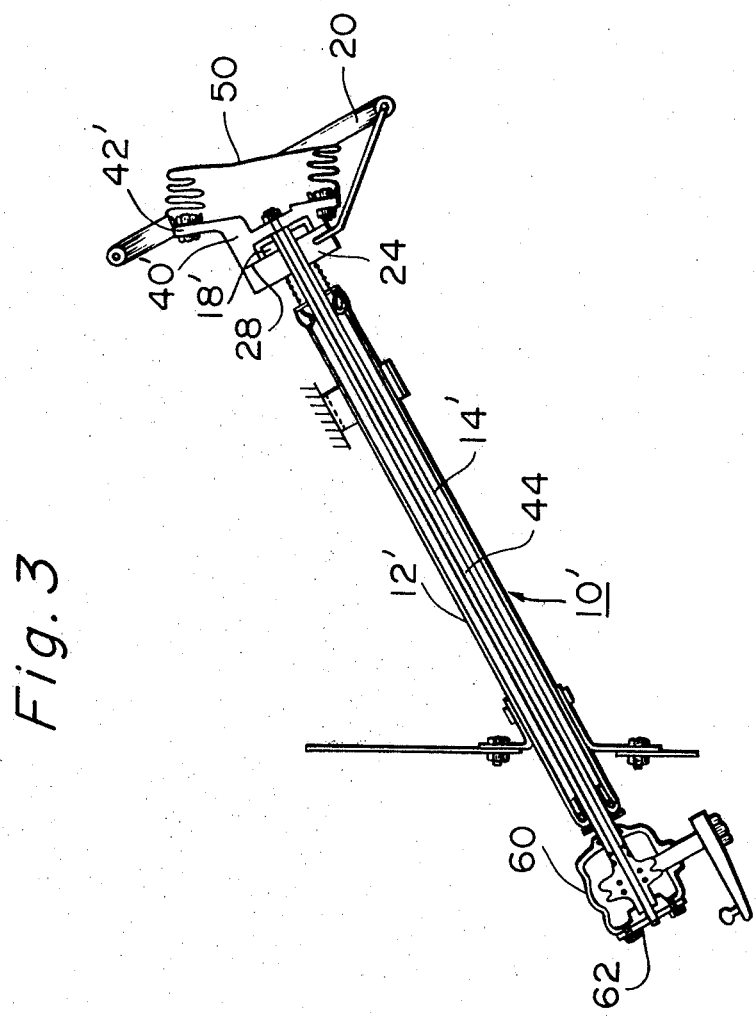

In a second preferred embodiment shown in FIG. 3, like in the first embodiment, the hub 24 of the steering wheel 20 is splined and fastened to the steering shaft 14' for rotation thereof, the shaft 14' being enclosed in an envelope 12'. The steering shaft 14' in this embodiment is a hollow tube in which a connecting rod 44 is concentrically enclosed. While one end of the rod 44 is secured to an appropriate fixed portion of the vehicle, the other end is fixedly connected to the center of a mounting bracket 40'. It is preferable to secure the one end of the rod 44 to a wall 62 of a conventional steering gear box 60 mounted on the steering shaft 14' to be stationary relative thereto. The mounting bracket 40', thus held in position, bears at its leg portion (no numeral) against the hub 24 in a manner to allow rotation of the hub 24 relative thereto. For facilitating such relative rotation, at least one spherical member 28 is rotatably supported between the hub 24 and the mounting bracket 40'. The bag 50 is secured to a flange 42' extending from the bracket 40' in the same fashion as in the first embodiment. As is apparent from the above description, the mounting bracket 40' is prevented from rotating with the angular movement of the steering wheel 20 because of its rigid connection to the fixed rod 44.

FIG. 4 shows a third preferred embodiment of the invention. While the connection between the hub 24 and the steering shaft 14'' is identical with that of the second embodiment, a mounting bracket 40'' is relatively rotatably carried between the hub 24 and a nut 18'' which fastens the hub 24 to the shaft 14''. A connecting plate 46 extends over, and is secured to a flange 42'' of the bracket 40''.

According to this embodiment, a relatively short hollow steering shaft 14'' terminates in an intermediate gear casing 70 secured to a stationary part of the vehicle body and is rotatably supported on a wall of the casing 70 by means of a plurality of ball bearings 76. Within the casing 70, a bevel gear 72 is fixedly mounted on the end of the steering shaft 14'' for rotation therewith. There is provided another bevel gear 74, in mesh with the gear 72, which is carried by another shaft 80 extending from the casing 70 in the direction away from the hub 24. It will be obvious that the hollow steering shaft 14'' and the shaft 80 are in power-transmitting connection by means of the bevel gears 72 and 74 at a certain angle with each other. The hollow steering shaft 14'' encloses a connecting rod 44' as in the second embodiment. One end of the rod 44'' is secured to the wall of the fixed casing 70, the other end being fastened to the connecting plate 46 of the mounting bracket 40''.

With this arrangement, while the hub 24 and the steering shaft 14' rotate with the angular movements of the steering wheel 20 and transmit the rotation to the shaft 80 through the bevel gears 72 and 74, the mounting bracket 40'' and bag 50 secured to the connecting plate 46 are kept stationary. Since in this embodiment the steering column assembly 10'' consists of two shaft sections 14'' and 80, the adjustment of the level of the steering wheel 20 with respect to the plane of the body floor (not shown) may be easier than in the second embodiment.

What is claimed is:

1. A vehicle steering wheel assembly comprising a rotatable steering shaft, a stationary envelope enclosing at least a lower portion of said shaft, a hub fixed to an upper portion of said shaft, a first bevel gear fixed to said envelope adjacent a lower end surface of said hub, a second bevel gear rotatably mounted adjacent an upper end surface of said hub, the diameter and the number of teeth of said first and second bevel gears being equal, at least one pair of bevel piniona in rotational meshing engagement with each other, about respective axes, the diameter and number of teeth of said pinions being equal; one of said pinions being in meshing engagement with said first bevel gear and the other of said pinions being in meshing engagement with said second bevel gear; means for connecting each of said pinions to said hub for rotation about said respective axes; a wheel rim; means connecting said rim to each of said pinions for rotation of said pinions about said respective axes; a mounting element fixed to said second bevel gear; and a driver restraining inflatable restraint device mounted on said mounting element; whereby said mounting element and said restraint device are maintained stationary as said wheel rim, hub and steering shaft are rotated.

2. A vehicle steering wheel assembly according to claim 1, in which said mounting element comprises a flange to which the inflatable confinement is fastened; and wherein the plane containing said flange is inclined with respect to a plane containing any axial end surface of the hub through a certain angle.

3. A vehicle steering wheel assembly according to claim 2, in which said mounting element comprises means for adjusting and varying said certain angle.

* * * * *